US006069470A

United States Patent [19]

Feldtkeller

[11] Patent Number: 6,069,470

[45] Date of Patent: May 30, 2000

[54] CIRCUIT CONFIGURATION FOR PRODUCING A LOAD-INDEPENDENT DC VOLTAGE

[75] Inventor: Martin Feldtkeller, München, Germany

[73] Assignee: Siemens Aktiengesellschaft, Munich, Germany

[21] Appl. No.: 09/099,474

[22] Filed: Jun. 18, 1998

[30] Foreign Application Priority Data

Jun. 18, 1997 [DE] Germany ........................... 197 25 842

[51] Int. Cl.[7] ..................................................... G05B 24/02

[52] U.S. Cl. ............................................. 323/222; 363/89

[58] Field of Search ..................... 363/89, 124; 323/222, 323/285, 286, 287

[56] References Cited

U.S. PATENT DOCUMENTS 5,371,667 12/1994 Nakao et al. ........................... 363/124

5,619,405 4/1999 Kammiller et al. ....................... 363/80

OTHER PUBLICATIONS

Jacob Mullman and Herbert Taub, Pulse, Digital, and Switching Waveforms, McGraw–Hill, sec 16–5, page 609, 1965.

*Primary Examiner*—Peter S. Wong

*Assistant Examiner*—Gary L. Laxton

*Attorney, Agent, or Firm*—Herbert L. Lerner; Laurence A. Greenberg; Werner H. Stemer

[57] ABSTRACT

The circuit configuration produces a load-independent DC voltage. A mains current input is controlled by a current control configuration. A function generator produces an output signal depending on an input signal according to a function y =f(x). The function generator is contained in a feedback branch from a voltage measurement configuration, which measures an output voltage, to the current control configuration. The derivative of the function f(x) depends on the input signal, and the derivative rises at least in sections with an increasing input signal.

10 Claims, 3 Drawing Sheets

Function Generator With Exponential Response

CIRCUIT CONFIGURATION FOR PRODUCING A LOAD-INDEPENDENT DC VOLTAGE

BACKGROUND OF THE INVENTION

Field of the Invention

The present invention relates to a circuit configuration for producing a load-independent DC voltage, having the following features:

- a first rectifier configuration with an AC voltage terminal and two output terminals;
- a current control configuration for controlling the mains current consumption, which is connected to the output terminals of the first rectifier configuration and has two output terminals;
- a second rectifier configuration connected to the output terminals of the current control configuration and having output terminals at which an output voltage can be tapped;
- a voltage measurement configuration furnishing a voltage signal at an output, which is connected to the output terminals of the second rectifier configuration;
- a feedback branch with a control configuration with an integrator configuration for feeding the voltage signal back to an input terminal of the current control configuration.

The object of circuit configurations of this type, which in particular are used in switched mode power supplies, is to provide as output voltage a DC voltage for the consumers which can be connected to the output terminals, the output voltage maintaining its value for load variations within a predetermined range.

If the mains voltage remains the same, a load variation occurring at the output terminals requires a variation in the, in particular sinusoidal, current consumption controlled by the current control configuration. If the current consumption and therefore the power consumption initially remain the same as the load varies, then a variation in the output voltage takes place. This variation is registered by the voltage measurement configuration and fed back as a voltage signal via the feedback branch to the current control configuration, so as to correct the current consumption in accordance with the load variation, until the output voltage again reaches the specified value. In order to avoid feedback of unavoidable variations in the output voltage around the specified value, which occur in particular when simple second rectifier configurations are used, integration of the control signal in the control configuration of the feedback branch is conventionally provided in circuit configurations of this type. Owing to a normally large integration time constant, load variations and therefore variations in the output voltage are fed back to the current control configuration with a delay, and the correction of the current variation therefore is relatively sluggish.

The variation in the current consumption is also necessary in the event of a variation in the mains voltage. This is particularly relevant when the circuit configuration is used in "extended-range" power supplies which are intended to deliver an output voltage which remains the same for input voltages between about 90V and 265V. If the input voltage varies, then the mains current consumption firstly varies proportionately to the voltage variation, while the power taken in and given out by the circuit configuration depends on the square of the voltage variation. If the current consumption is at first not corrected, then the output voltage firstly falls, for example when the mains voltage is reduced, this variation being registered by the voltage measurement configuration and fed back as in integrated voltage signal via the feedback branch to the current measurement configuration.

Both in the event of a load variation and in the event of a variation in the mains voltage, the current consumption is corrected until the output voltage is again set to the specified value.

The controlling of the current consumption in the current control configuration takes place with the use of a control loop which is fed with a weighted mains voltage signal, the current consumption being set proportionately to this signal. Conventionally, the generation of the weighted mains voltage signal takes place by multiplying a control signal applied to the input terminal of the current control configuration by a mains voltage signal depending directly on the mains voltage.

If, for example for the same load, the output voltage applied to the output terminals and therefore the power put out is to be maintained when the mains voltage is halved, then it is necessary to double the original current consumption, that is to say the mains voltage signal is to be weighted with a factor of four in order to achieve a current consumption which is twice as large as the original current consumption. The control signal applied to the input terminal of the current control configuration is therefore dependent on the square of the mains voltage, the signal being commensurately larger as the mains voltage is smaller.

Equal load variations at the output terminals of the current control configuration cause equal voltage variations in the output signal, while a signal variation which depends on the mains voltage is required at the input terminal. A variation in the signal applied to the input terminal must take place proportionately to the load variation, that is to say the control signal must halve if, for example, the load is halved. Since the signal excursion of the voltage signal is merely load-dependent, but the signal excursion of the control signal applied to the input terminal of the current control configuration is dependent on the mains voltage, correction of the output voltage for equal load variation at the output takes a different length of time for differing mains voltages. The time taken for the equalization thus increases nine-fold when the input voltage is reduced by a third for equal load variation.

To avoid this problem in the prior art circuit configuration of this type, the root mean square of the mains voltage is taken in account when forming the weighted mains voltage signal. The averaging is effected with a multipole low pass filter, which is very expensive.

In another prior art circuit configuration, a changeover switch is provided which carries out additional weighting of the mains voltage signal in a ratio of 1:4. That weighting is exact only for two different input voltages, usually 120 V and 240 V.

SUMMARY OF THE INVENTION

It is accordingly an object of the invention to provide a circuit configuration for producing a load-independent DC voltage, which overcomes the above-mentioned disadvantages of the prior art devices and methods of this general type and which corrects the output voltage independently of the load and at least approximately independently of the mains voltage.

With the foregoing and other objects in view there is provided, in accordance with the invention, a circuit configuration for producing a load-independent DC voltage, comprising:

a first rectifier configuration having an AC voltage terminal and two output terminals;

a current control configuration for controlling the mains current consumption, the current control configuration being connected to the output terminals of the first rectifier configuration, having two output terminals, and an input terminal;

a second rectifier configuration connected to the output terminals of the current control configuration and having output terminals furnishing an output voltage;

a voltage measurement configuration connected to the output terminals of the second rectifier configuration, the voltage measurement configuration providing a voltage signal;

a feedback branch connected to receive the voltage signal from the voltage measurement configuration and to feed the voltage signal back to the input terminal of the current control configuration, the feedback branch including a control configuration with an integrator;

a function generator connected downstream of the control configuration in the feedback branch, the function generator producing an output signal which depends on an input signal according to a function f(x), wherein a derivative of the function f(x) is dependent on an input signal, and the derivative rises at least partly with an increasing input signal.

The output signal of the function generator, which is fed to the current control configuration at its input terminal for weighting of the mains voltage signal, is dependent according to y=f(x) on a signal which is delivered by the integration configuration and in turn depends on the voltage signal. Because the slope of the function f(x) increases at least in sections, equal variations in the input signal cause, in absolute terms, commensurately larger variations in the output signal as the value of the output signal is larger. Variations in the voltage signal, in the event of a variation in the load connected to the output terminals of the circuit configurations, therefore have an effect, dependent on the value of the signal applied to the input terminal, on this signal applied to the input terminal. Although the control signals applied to the input terminal for different mains voltages are still dependent on the square of the respective mains voltage, a variation in these signals, for equal load variation, takes place as a function of its absolute value, because of the function generator. The effect of the mains voltage, on which the value of the control signal depends, on the time taken to correct the current consumption is therefore reduced considerably.

In accordance with an added feature of the invention, the function generator produces the output signal substantially in accordance with the function $f(x)=c\times a^{bx}$, wherein a, b, and c are constants.

The output signal of the function generator, which is fed to the current control configuration at its input terminal for weighting of the mains voltage signal, is therefore exponentially dependent on the signal delivered by the integrator, which in turn depends on the voltage signal. Variations in the voltage signal, in the event of a variation in the load connected to the output terminals of the circuit configurations, thus have an exponential effect on the control signal applied to the input terminal. The control signals applied to the input terminal for different mains voltages are dependent on the square of the respective mains voltage, but because of the function generator with exponential transfer function, a variation in the signals for equal load variation takes place proportionately to its absolute value. The mains current consumption is therefore controlled independently of the load and the mains voltage in this embodiment. Depending on the load range to be controlled, the exponential function may be approximated in the required section by a rational function $y=f(x)=x^n$ (or $f(x)=c\times x^n$). The constant n is thereby preferably greater than 2. The exponential function may also be approximated by by any other polynomial function.

In accordance with another feature of the invention, the constant a is the Euler number e. Function generators of this type, with an exponential response to the base e can be produced simply using a diode or a transistor.

In accordance with an further feature of the invention, a first subtractor circuit is connected to an output of the function generator for subtracting a constant signal from the output signal. When the circuit configuration is running at no load, that is to say the load is removed from the output terminals, then the current in the current control configuration must be reset to zero, neglecting losses in the circuit configuration. This requires a zero signal at the input terminal of the current control configuration. With a function generator which has an exponential response, it is not possible to produce a zero output signal, since this theoretically requires an input signal with the value minus infinity. By subtracting a constant signal from the output signal of the function generator, it is possible to achieve a zero value at the input terminal of the current control configuration for a finite input signal of the function generator.

In accordance with again another feature of the invention, a second subtractor configuration is connected to an input of the integrator configuration in the control configuration. The second subtractor configuration subtracts a voltage signal from a reference signal.

In accordance with again an additional feature of the invention, the current control configuration includes a power switch connected in parallel with the output terminals thereof, a pulse width modulator connected to the power switch, a second voltage measurement configuration, a current measurement configuration connected to the pulse width modulator, a third subtractor configuration connected to the pulse width modulator and a multiplier configuration connected to the third subtractor configuration; the power switch is opened and closed in dependence of an output signal of the pulse width modulator, and an input of the pulse width modulator is fed via the third subtractor configuration with a difference signal given by a difference between a signal provided by the current measurement configuration and a product signal provided by the multiplier configuration, the product signal being formed by the multiplier configuration from an output signal of the second voltage measurement configuration and a signal applied to the input terminal of the current control configuration.

In the specific embodiment, the power switch is opened or closed depending on an output signal of the pulse width modulator, and an input of the pulse width modulator being fed via the second subtractor with a difference signal which is given by the difference between a signal delivered by the current measurement configuration and a product signal delivered by the multiplier configuration. The product signal is formed by the multiplier configuration from the output signal of the second voltage measurement configuration, which corresponds to the mains voltage signal, and the control signal applied to the input terminal of the current control configuration. When there is a sinusoidal mains voltage, a current control configuration of this type causes an essentially sinusoidal mains current consumption, it being possible for the amplitude of the mains current consumption to be varied by evaluating the mains voltage signal.

In accordance with a concomitant feature of the invention, the first rectifier configuration includes a bridge rectifier.

With a further aspect of the invention, the above-described circuit configuration is suitably utilized in a switched mode power supply.

Other features which are considered as characteristic for the invention are set forth in the appended claims.

Although the invention is illustrated and described herein as embodied in a circuit configuration for producing a load-independent DC voltage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
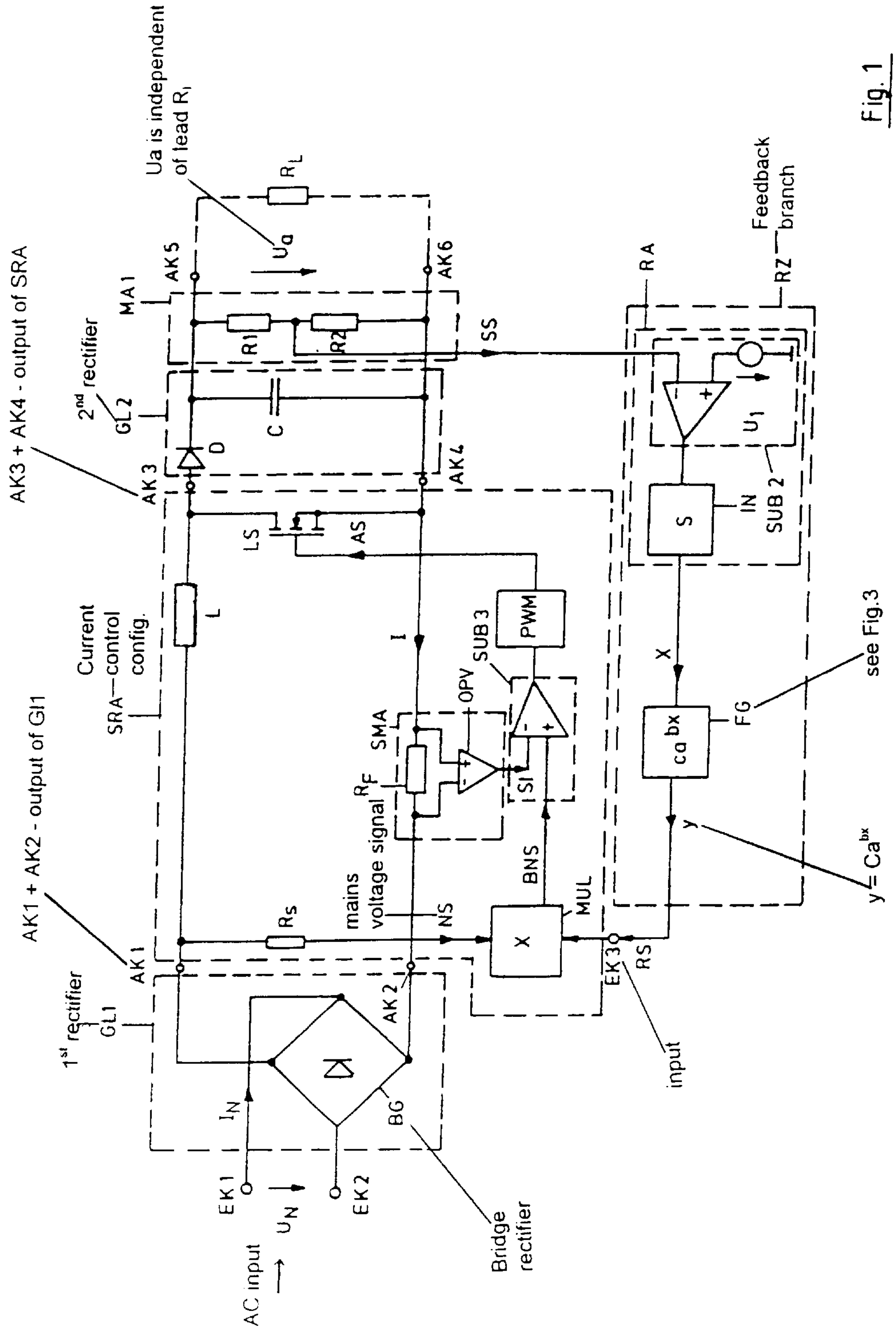
FIG. 1 is a circuit diagram of a first exemplary embodiment of the invention.

Referring now to the figures of the drawing in detail and first, particularly, to FIG. 1 thereof, there is seen a first rectifier configuration GL1 with a bridge rectifier BG, an AC voltage terminal EK1, EK2 and output terminals AK1, AK2 to which a current control configuration SRA is connected. The current control configuration has an input terminal EK3 for application of a control signal RS delivered by a feedback branch RZ. The current control configuration SRA also has output terminals AK3, AK4 to which a second rectifier configuration GL2 is connected. At output terminals AK5, AK6 of the second rectifier configuration GL2, it is possible to tap an output voltage $U_a$ which is intended to be kept constant independently of a load $R_L$ connected to the output terminals AK5, AK6.

A first voltage measurement configuration MA1 , which delivers a voltage signal SS depending on the output voltage $U_a$ to a control configuration RA in the feedback branch RZ, is further connected to the output terminals AK5, AK6 of the second rectifier configuration GL2. A function generator, which in the represented illustrative embodiment delivers an output signal y depending on an input signal x according to $y=c \times a^{bx}$, is connected downstream of the control configuration RA in the feedback branch RZ. In the exemplary embodiment of FIG. 1, the output signal y is fed to the input terminal EK3 of the current control configuration SRA directly as a control signal RS. FIG. 4 is a diagrammatic view of a second exemplary embodiment of the function generator with an exponential response.

The current control configuration SRA has a second voltage measurement configuration, which includes a resistor RS connected to the output terminal AK1 of the first rectifier configuration GL1 and at which it is possible to tap a mains voltage signal NS. Because of the bridge rectifier BG, this mains voltage signal NS is dependent on the magnitude of the mains voltage $U_N$. After multiplication of the mains voltage signal NS in a multiplier MUL by the control signal RS, subtraction of a current signal SI, delivered by a current measurement configuration SMA, from the weighted mains voltage signal BNS, resulting from the weighting of the mains voltage signal NS with the control signal RS, takes place. In the represented example, the current measurement configuration SMA has a current sensing resistor RF, at which a voltage drop is caused by means of a current I flowing into the current control configuration SRA or flowing out. The voltage drop is determined by an operational amplifier OPV and delivered as a current signal SI to a third subtractor configuration SUB3. An output signal of the third subtractor configuration SUB3 is applied to an input of a pulse width modulator PWM, at the output of which drive signals AS are applied. The drive signals AS open or close a power switch LS connected between the output terminals AK3, AK4 of the current control configuration SRA. When the power switch LS is closed, the current I in the current control configuration flows through an inductor L and the power switch; in this case the inductor L takes in energy. When the power switch LS is open, the inductor L gives out energy in the form of current through a diode D to a capacitor C of the second rectifier configuration GL2. The drive signals AS of the pulse width modulator PWM are such that the switch LS is closed commensurately longer as the signal applied to the input of the pulse width modulator PWM is greater.

In the case of a sinusoidal mains voltage $U_N$, or rectified-sinusoidal mains voltage signal NS, the represented current control configuration SRA gives rise to a sinusoidal mains current consumption IN, or a rectified-sinusoidal current I. The amplitude of the current I is proportional to the amplitude of the weighted mains voltage signal BNS delivered by the multiplier configuration MUL. Halving of the mains voltage $U_N$ causes halving of the mains current consumption, or a reduction in the power put out to the load $R_L$ by a factor of 4. When the mains voltage $U_N$ is halved, it is necessary to double the mains current consumption relative to the original mains current consumption in order to maintain the power originally put out, and therefore to keep the output voltage $U_a$ at a predeterminable value. The control signal applied to the input terminal EK3 of the current control configuration SRA therefore needs to be increased by a factor of 4 relative to the original value. This is explained as follows:

When the mains voltage $U_N$ is reduced, the mains current consumption, or the current I flowing in the current control configuration SRA, is reduced proportionately. If the control signal RS does not at first vary, then the power put out to the load $R_L$ falls, and the output voltage $U_A$ therefore falls. A voltage signal SS, formed from the output voltage by means of first and second resistors R1, R2 in the first voltage measurement configuration MA1, is subtracted from a reference signal $U_1$ in the control configuration RA of the feedback branch RZ, and subsequently integrated in an integrator configuration IN. When the output voltage UA falls because of a reduction in the power output, then the voltage signal SS also falls, and an output signal delivered by the second subtractor configuration SUB2 increases, and an output signal delivered by the integrator configuration IN also increases. The function generator FG connected downstream of the integrator configuration IN uses this output signal as its input signal x, and, from it, produces an output signal y. The output signal y depends exponentially on the signal x and it is fed to the current control configuration SRA in the represented example directly as a control signal. The control signal RS, and therefore the current I flowing in the current control configuration SRA, increases until the output voltage $U_a$ again reaches a predetermined value, at which the voltage signal SS corresponds to the reference signal $U_1$, so that the control signal RS is no longer increased further. When the mains voltage $U_N$ is increased, the control signal RS is reduced correspondingly.

In the same way, the current consumption, or the current I flowing in the current control configuration SRA is corrected if the load $R_L$ varies while the mains voltage $U_N$ remains the same. In this case, if the control signal RS firstly remains constant, then the power taken in or put out also remains constant, and the output voltage $U_A$ varies. Thereupon, in the described way, the control signal RS is corrected until the output voltage $U_A$ again reaches a specified value.

As mentioned above, the control signal RS depends on the square of the mains voltage $U_N$, while equal load variations firstly cause equal variations in the output voltage $U_A$, independently of the mains voltage $U_N$. Therefore, equal load variations also cause equal variations in the output signal delivered by the integrator configuration IN, while by means of this variations in the control signal RS have to be brought about which are dependent on the input voltage $U_N$. Because of the exponential behavior of the function generator FG, linear variations in the input signal x have a proportional effect on variations in the output signal y. This can be explained clearly with the aid of the following equation, according to which $$y=c \times a^{bx}.$$

If the input signal x varies by the value Δx, then the new output signal y1 is given as:

$$y1=c \times a^{bx} a^{b\Delta x}.$$

The variation in the output signal is therefore independent of its absolute value, and dependent only on the variation in the input signal x. Therefore, with an exponential response of the function generator, and variation in the mains voltage $U_N$, or variation in the load $R_L$, correction of the output value $U_A$ takes place independently of the mains voltage.

A desired exponential function can preferably be approximated by a polynomial within a function range relevant to the input signals x and the output signals y.

Figure 2:
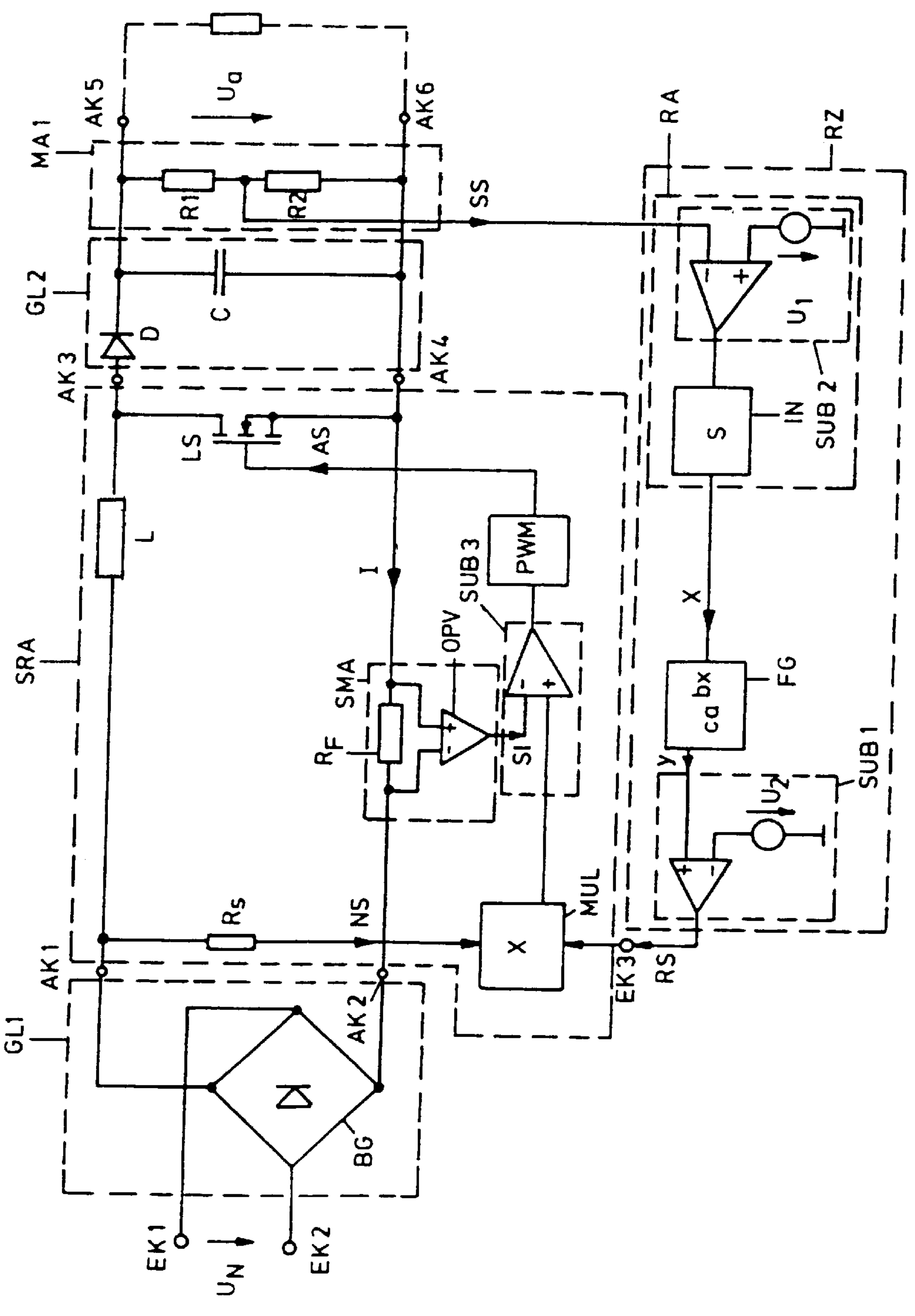
FIG. 2 is a circuit diagram of a second exemplary embodiment of the invention.

FIG. 2 shows a further embodiment of a circuit configuration according to the invention, in which an additional subtractor configuration defined as a first subtractor configuration SUB1 is provided. SUB1 subtracts a constant signal $U_2$ from the output signal y of the function generator FG and it is connected downstream of the function generator FG. By means of this, for finite input signals x, it is possible to achieve a zero control signal, which is required when the circuit configuration is running at no load.

Figure 3:
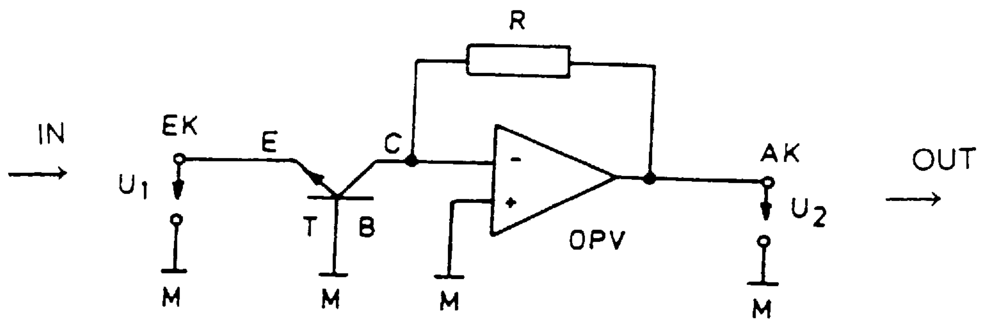
FIG. 3 is a diagrammatic view of an exemplary embodiment of a function generator with exponential response.

FIG. 3 represents, by way of example, a circuit for a function generator FG with exponential response. The function generator FG has a transistor T which is connected by a base electrode B to the reference potential M, by an emitter electrode E to an input terminal EK, and by a collector electrode C through a resistor R to an output terminal AK. Between the collector electrode C and the output terminal AK, there is an operational amplifier OPV which is connected by one input to the collector electrode C and by another input to the reference potential M. In this circuit, a voltage $U_2$ applied between the output terminal AK and the reference potential is produced exponentially to a base e from a voltage $U_1$ applied between the input terminal EK and the reference potential.

As an alternative to the transistor T shown in FIG. 3, a diode can be used. FIG. 4 shows a function generator FG with an exponential behavior that is constructed with a diode $D_{FG}$. The cathode of the diode $D_{FG}$ is connected to the input terminal EK and the anode of the diode $D_{FG}$ is connected through resistor R to the output terminal AK.

I claim:

1. A circuit configuration for producing a load-independent DC voltage, comprising:

- a first rectifier configuration having an AC voltage terminal and two output terminals;
- a current control configuration for controlling the mains current consumption, said current control configuration being connected to said output terminals of said first rectifier configuration, having two output terminals, and an input terminal;
- a second rectifier configuration connected to said output terminals of said current control configuration and having output terminals furnishing an output voltage;
- a voltage measurement configuration connected to said output terminals of said second rectifier configuration, said voltage measurement configuration providing a voltage signal;
- a feedback branch connected to receive the voltage signal from said voltage measurement configuration and to feed the voltage signal back to said input terminal of said current control configuration, said feedback branch including a control configuration with an integrator;
- a function generator connected downstream of said control configuration in said feedback branch, said function generator producing an output signal which depends on an input signal according to a function f(x), wherein a derivative of the function f(x) is dependent on an input signal, the derivative rises at least partly with an increasing input signal, and said function generator produces the output signal selected from the group consisting of in accordance with a function $f(x)=c+a^{bx}$ or $f(x)=c+x^n$, wherein a, b, c and n are constant real numbers.

2. The circuit configuration according to claim 1, wherein the constant a is the Euler number e.

3. The circuit configuration according to claim 2, wherein n is greater than 2.

4. The circuit configuration according to claim 1, which further comprises a first subtractor circuit connected to an output of said function generator for subtracting a constant signal from the output signal.

5. The circuit configuration according to claim 1, wherein said function generator includes a diode.

6. The circuit configuration according to claim 1, wherein said function generator includes a transistor.

7. The circuit configuration according to claim 5, which further comprises a second subtractor configuration connected to an input of said integrator of said control configuration, said second subtractor configuration subtracting a voltage signal from a reference signal.

8. The circuit configuration according to claim 1, which further comprises a subtractor configuration connected to an input of said integrator of said control configuration, said subtractor configuration subtracting a voltage signal from a reference signal.

9. The circuit configuration according to claim 1, wherein:

said current control configuration includes a power switch connected in parallel with said output terminals thereof, a pulse width modulator connected to said power switch, a second voltage measurement configuration, a current measurement configuration, a third subtractor configuration connected to said pulse width modulator and to said current measurement configuration, and a multiplier configuration connected to said third subtractor configuration;

said power switch is opened and closed in dependence of an output signal of said pulse width modulator, and an input of said pulse width modulator is fed via said third subtractor configuration with a difference signal given by a difference between a signal provided by said current measurement configuration and a product signal provided by said multiplier configuration, the product signal being formed by said multiplier configuration from an output signal of said second voltage measurement configuration and a signal applied to said input terminal of said current control configuration.

10. The circuit configuration according to claim 1, wherein said first rectifier configuration includes a bridge rectifier.

* * * * *